US011216719B2

United States Patent
Majumdar et al.

(10) Patent No.: US 11,216,719 B2
(45) Date of Patent: Jan. 4, 2022

(54) METHODS AND ARRANGEMENTS TO QUANTIZE A NEURAL NETWORK WITH MACHINE LEARNING

(71) Applicant: INTEL CORPORATION, Santa Clara, CA (US)

(72) Inventors: Somdeb Majumdar, Mission Viejo, CA (US); Ron Banner, Yoqneam Illit (IL); Marcel Nassar, San Diego, CA (US); Lior Storfer, Tel Aviv (IL); Adnan Agbaria, Haifa (IL); Evren Tumer, Temecula, CA (US); Tristan Webb, San Diego, CA (US); Xin Wang, San Diego, CA (US)

(73) Assignee: INTEL CORPORATION, Santa Clara, CA (US)

( * ) Notice: Subject to any disclaimer, the term of this patent is extended or adjusted under 35 U.S.C. 154(b) by 780 days.

(21) Appl. No.: 16/009,456

(22) Filed: Jun. 15, 2018

(65) Prior Publication Data

US 2019/0042945 A1    Feb. 7, 2019

Related U.S. Application Data

(60) Provisional application No. 62/597,804, filed on Dec. 12, 2017.

(51) Int. Cl.
*G06N 3/04* (2006.01)
*G06N 3/08* (2006.01)
*G06N 3/063* (2006.01)

(52) U.S. Cl.
CPC ............. *G06N 3/0454* (2013.01); *G06N 3/04* (2013.01); *G06N 3/063* (2013.01); *G06N 3/084* (2013.01); *G06N 3/0445* (2013.01); *G06N 3/0635* (2013.01)

(58) Field of Classification Search
CPC ............ G06N 3/04; G06N 3/08; G06N 3/063; G06N 3/0635; G06N 3/0454
See application file for complete search history.

(56) References Cited

U.S. PATENT DOCUMENTS

| | | | |
|---|---|---|---|
| 2017/0323197 A1* | 11/2017 | Gibson | G06N 3/063 |
| 2019/0050710 A1* | 2/2019 | Wang | G06N 3/063 |
| 2019/0171935 A1* | 6/2019 | Agrawal | G06N 3/0445 |
| 2020/0218982 A1* | 7/2020 | Annau | G06N 20/00 |

OTHER PUBLICATIONS

Choi, Yoojin et al.; Towards the Limit of Network Quantization; ICLR 2017; pp. 1-14. (Year: 2017).*
Guo, Yunhui et al.; A Survey on Methods and Theories of Quantized Neural Networks; 2018; 17 pages. (Year: 2018).*

* cited by examiner

*Primary Examiner* — Stanley K. Hill
(74) *Attorney, Agent, or Firm* — Kacvinsky Daisak Bluni PLLC

(57) ABSTRACT

Logic may quantize a primary neural network. Logic may generate, by a secondary neural network logic circuitry for a primary neural network logic circuitry, quantization parameters. The primary neural network logic circuitry may comprise a primary neural network with multiple layers trainable with an objective function. Each of the multiple layers of the primary neural network may comprise multiple tensors. The secondary neural network logic circuitry may comprise one or more secondary neural networks trainable with the objective function to output the quantization parameters to the tensors.

25 Claims, 6 Drawing Sheets

METHODS AND ARRANGEMENTS TO QUANTIZE A NEURAL NETWORK WITH MACHINE LEARNING

CROSS REFERENCE TO RELATED APPLICATIONS

This application claims priority under 35 USC § 119 from U.S. Provisional Application No. 62/597,804, entitled "Methods, Systems, Articles of Manufacture and Apparatus to Improve Neural Network Efficiency", filed on Dec. 12, 2017, the subject matter of which is incorporated herein by reference.

TECHNICAL FIELD

Embodiments described herein are in the field of the machine learning. More particularly, the embodiments relate to methods and arrangements to quantize a neural network with machine learning.

BACKGROUND

Deep learning is a rapidly growing field that achieves state-of-the-art performance in solving many key data-driven problems in a wide range of industries. With major chip makers' quest for novel hardware architectures for deep learning, the next few years will see the advent of new computing devices optimized for training and inference of deep neural networks with increasing performance at decreasing cost.

Deep learning research is currently done on central processing unit (CPU) and/or graphics processing unit (GPU) architectures that offer native 64-bit, 32-bit or 16-bit floating point data format and operations. Substantial improvements in hardware footprint, power consumption, speed, and memory requirements could be obtained with more efficient data formats. This calls for innovations in numerical representations and operations specifically tailored for deep learning needs.

Inference with low bit-width fixed point data formats has made significant advancement, whereas low bit-width training remains an open challenge. Because training in low precision reduces memory footprint and increases the computational density of the deployed hardware infrastructure, advancements in low bit-width training are desirable.

DETAILED DESCRIPTION OF EMBODIMENTS

Figure 1A:
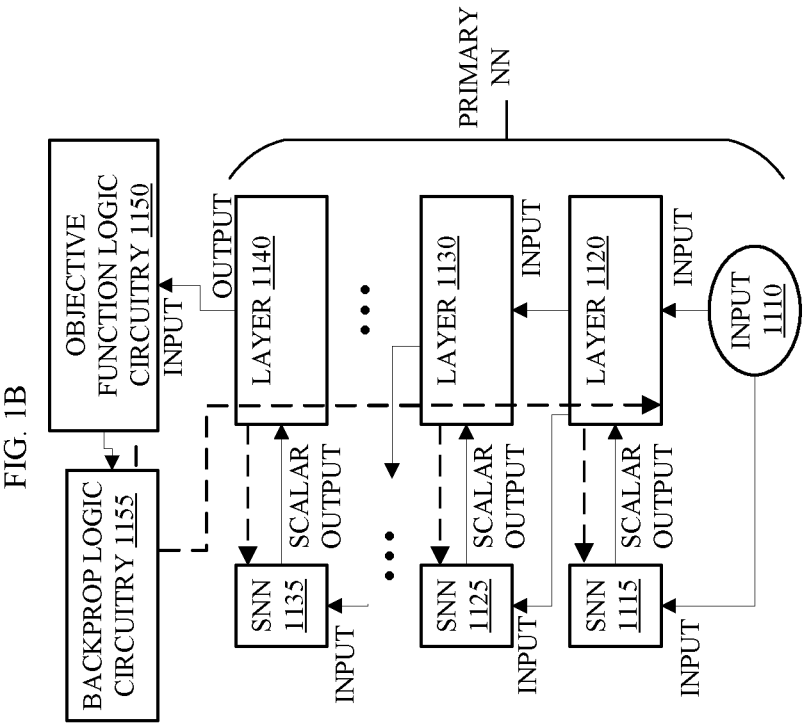
FIG. 1A depicts an embodiment of a system including processors, memory, a neural compute engine, and neural network pipelines.

The following is a detailed description of embodiments depicted in the drawings. The detailed description covers all modifications, equivalents, and alternatives falling within the appended claims.

Generally speaking, methods and arrangements to quantize a neural network with machine learning are contemplated. Embodiments train one or more secondary neural networks to determine scalar multipliers, or exponents, for tensors in layers of a primary, deep neural network (DNN) to balance the dynamic range of values for tensors with the precision of the values. Several embodiments train the secondary neural networks concurrently with the primary neural network with the same objective function via back-propagation. In some embodiments, the secondary neural networks determine scalar multipliers for the tensors of each layer of the primary neural network and, in further embodiments, the secondary neural networks determine scalar multipliers for more than one tensors in each layer of the primary neural network. In some embodiments, the secondary neural networks determine scalar multipliers for the weight and bias for all tensors in each layer. Some embodiments train with the primary, DNN with the objective function and metrics of the primary DNN. And some embodiments are pretrained using heuristic algorithms and supervised learning.

Several embodiments may implement a flexible, low bit-width numerical format, referred to as Flexpoint. The flexible, low bit-width numerical format may faithfully maintains algorithmic parity with full-precision floating point training and support a wide range of deep network topologies, while at the same time substantially reduce consumption of computational resources. These characteristics may make the flexible, low bit-width numerical format amenable for specialized training hardware optimized for field deployment of already existing deep learning models.

The low bit-width data format may combine the advantages of fixed point and floating-point arithmetic. For instance, embodiments may use a common exponent for integer values in a tensor to reduce computational and memory requirements while automatically managing the exponent of each tensor in a user transparent manner. Many embodiments are based on tensors with an N-bit mantissa storing an integer value in two's complement form, and an M-bit exponent e, shared across all elements of a tensor. This format is denoted as flexN+M and one example is a Flexpoint tensor with a 16-bit mantissa and 5-bit exponent, i.e. flex 16+5. In contrast to floating point, the exponent is shared across tensor elements, and different from fixed point, the exponent may be updated automatically every time a tensor is written.

Compared to 32-bit floating point, Flexpoint may advantageously reduce both memory and bandwidth requirements in hardware, as storage and communication of the exponent can be amortized over the entire tensor. Power and area requirements may also be reduced due to simpler multipliers compared to floating point. For instance, logic circuitry can multiply entries of two separate tensors as a fixed-point operation since the common exponent is identical across all the output elements. For the same reason, logic circuitry can compute the addition of entries across elements of the same tensor as fixed-point operations. This essentially turns a majority of computations of deep neural networks into fixed point operations.

These advantages come at the cost of added complexity of exponent management and dynamic range limitations imposed by sharing a single exponent. To preserve a faithful representation of floating point, tensors with a shared exponent may have a sufficiently narrow dynamic range such that mantissa bits alone can encode variability. 16-bits of mantissa may be sufficient to cover the majority of values of a single tensor. For performing operations such as adding gradient updates to weights, there may be sufficient mantissa overlap between tensors, putting additional requirements on number of bits needed to represent values in training, as compared to inference. Establishing that deep learning tensors conform to these requirements during training may improve results. An alternative embodiment includes stochastic rounding. Furthermore, to implement Flexpoint efficiently in hardware, the output exponent may be determined before the operation is actually performed.

Other embodiments may determine a different exponent for each tensor in a layer of the deep neural network. In such embodiments, computations with different tensors will not effectively be fixed point operations but will require usage of the exponent for each tensor involved.

Many embodiments implement a secondary neural network with a transitivity layer as the hidden layer. The transitivity layer may be a convolutional layer that applies an activation function and, in some embodiments, a pre-activation function, that presents an equation of discrete time representations of the value function with weights and biases. The weights and biases can be incrementally adjusted in steps of a size related to the learning factor, gamma, in the value function. The incremental adjustments converge the value function at an optimal action for each state after the initial state through a process of backward propagation, also referred to as backpropagation or backprop.

Embodiments may implement experience replay by selecting mini-batches of the policies with which to perform a gradient descent and iteratively processing the mini-batches until the neural network performs gradient descent for an epoch of the training data. Backward propagation refers to a convolution of the difference between the gradient descent output for the value function at each state, which is between zero and one, and the optimal or best gradient descent which is one. In several embodiments, neural network logic circuitry convolves the difference by applying the difference to the activation function and applying a filtered version of the difference, filtered due to the application of the activation function, to the weights and biases and scalar multipliers for the weights and biases for the value function.

With sufficient training data from instances of one or more different inputs, for a variety of policies that assign quantization parameters, the neural network logic circuitry may converge the value function through gradient descent and backpropagation to determine optimal policies via the objective function of the primary neural network logic circuitry or supervised training.

In many embodiments, after convergence of the value function for each optimal policy, the neural network logic may calculate initial states, $Q(s_0, a_0)$ for each of the optimal policies. Thereafter, the neural network logic circuitry may select the optimal policy, based on metrics from the input, for determining quantization parameters for tensors in the layers of the primary neural network logic circuitry.

Various embodiments may be designed to address different technical problems associated with quantization of a primary neural network. Other technical problems may include management of exponents for tensors during training of a deep neural network; determining an exponent (one or more scalar multipliers) to balance dynamic range with precision, training with low bit-width data format; determining a scale factor for a weight of a tensor; determining a scale factor for a bias of a tensor; and/or the like.

Different technical problems such as those discussed above may be addressed by one or more different embodiments. For instance, some embodiments that address problems associated with quantization of a primary neural network may do so by one or more different technical means, such as, generating, by a secondary neural network logic circuitry for a primary neural network logic circuitry, quantization parameters, wherein the primary neural network logic circuitry comprises a primary neural network with multiple layers trainable with an objective function, wherein each of the multiple layers of the primary neural network comprises multiple tensors, wherein the secondary neural network logic circuitry comprises one or more secondary neural networks trainable with the objective function to output the quantization parameters to the tensors; generating, by a primary neural network logic circuitry, an output; evaluating the output via the objective function to determine errors; backpropagating the errors through the primary neural network logic circuitry to train the primary neural network logic circuitry; training the secondary neural networks via the objective function of the primary neural network while training the primary neural network via backpropagation; training the secondary neural networks prior to training the primary neural network via a heuristic parameters and supervised learning; generating a quantization parameter for one or more tensors in each layer of the multiple layers of the primary neural network; determining the quantization parameter that comprises one or more scalar multipliers for a floating-point number of a tensor in at least one layer of the multiple layers of the primary neural network and computing via the at least one layer with tensors as fixed-point numbers; implementing a secondary neural network as a single-parameter neural network that is trainable via backpropagation; implementing a secondary neural network as a multiple-parameter neural network that is trainable via backpropagation; and the like.

Several embodiments comprise systems with multiple processor cores such as central servers, access points, and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Turning now to the drawings, FIG. 1A illustrates an embodiment of a system 1000. The system 1000 may be an embedded system such as a deep learning accelerator card, a processor with deep learning acceleration, a neural compute stick, or the like. The system 1000 comprises an interface (I/F) 1015, processor(s) 1020, memory 1030, a neural compute engine 1040, neural network pipelines 1050, and vector processor(s) 1060. In some embodiments, the system 1000 comprises a System on a Chip (SoC) and, in other embodiments, the system 1000 includes a printed circuit board or a chip package with two or more discrete components.

The I/F 1015 may comprise a universal serial bus (USB) port, a Peripheral Component Interconnect enhanced (PCIe) bus interface, a point-to-point interface, a wireless communications interface, and/or the like. The I/F 1015 may couple with, e.g., a host system or other system to receive input data for a primary neural network residing on the system 1000 in the memory 1030, processor(s) 1020 and/or vector processor(s) 1060. In further embodiments, the I/F 1015 may couple with the host system or other system to receive a primary neural network for training on the system 1000.

The processor(s) 1020 may comprise the main processors for the system 1000 and may execute an operating system residing in the code 1032 in the memory 1030. The operating system may receive, store, and train a primary, deep neural networks (DNNs) via a hardware accelerator, the neural compute engine 1040, the neural network pipelines 1050, and the vector processor(s) 1060. For instance, a host system may provide a primary DNN with cascaded stages for face detection, speech recognition, or the like, and may transmit the DNN to the system 1000 for training along with an objective function and/or supervised data. Thereafter, the host system may provide input data to the primary DNN such as images as input data in the form of tensor data for training. The system 1000 may transmit the output of the primary DNN to the host system after completion of the training computations on the images.

In the present embodiment, the processor(s) 1020 and the memory 1030 include quantization logic circuitry 1022 and 1034, respectively. The quantization logic circuitry 1022 may comprise processor circuitry of processor(s) 1020 that store and/or execute secondary neural network logic circuitry to quantize parameters for the primary DNN during training of the primary DNN.

The quantization logic circuitry 1022 and/or 1034 may comprise a training logic to train secondary neural networks of the secondary neural network logic circuitry concurrently with training the primary DNN via the objective function of the primary DNN or may execute the secondary neural networks in inference mode where the secondary neural networks are pretrained with supervision via heuristic data. For example, each tensor in the primary DNN may represent a block of numbers with a shared exponent and the second neural networks may predict or determine optimal exponents for the tensors. For the secondary neural networks that train concurrently with the primary DNN, one or more secondary neural networks may couple with each layer of the primary DNN to provide scalar multipliers for the tensors in the corresponding layer. During training of the primary DNN, the secondary neural networks may train through backpropagation from the primary DNN layer based on the objective function of the primary DNN. In other words, the secondary neural networks have the same objective and are trained via the same metrics as the primary DNN.

Furthermore, some of these embodiments may implement single-parameter secondary neural networks and some of these embodiments may implement multiple-parameter secondary neural networks. The single-parameter secondary neural networks may effectively add a parameter to the primary DNN with inclusion layers to adjust the exponent, e, where the floating-point value is represented by a mantissa multiplied by the exponent, which is $2^{-e}$. The single-parameter secondary neural networks may output the exponent as scalar multipliers for the weights and biases of the activation function of each layer in the primary DNN.

The multiple-parameter secondary neural networks may operate as typical neural network with a small number of parameters such as 10 parameters or 30 parameters training to determine an output for an exponent based on the objective function of the primary DNN via backpropagation. The multiple-parameter secondary neural networks may output the exponent as scalar multipliers for the weights and biases of the activation function of each layer in the primary DNN.

For operation in inference mode, one or more secondary neural networks may couple with each layer of the primary DNN to provide scalar multipliers for the tensors in the corresponding layer. The pretraining may be based on supervised data, which is referred to as supervised learning. The supervised data may include pairs of input data and expected output data so the secondary neural networks can train by incrementally adjusting the parameters of the activation function based on errors in the output with respect to the expected output. The secondary neural networks train based on heuristic prediction parameters including parameters such as a maximum absolute value of a tensor (maximum mantissa), an overflow parameter, a maximum absolute value history such as the last 16 maximum absolute values, an exponent setting history such as the last 16 scalar multiplier values, a type of tensor, a type of the following X sensors such as 3 sensors, a type of kernel being activated, a place or location of a tensor in the network, a number of epochs, a number of iterations, and/or other parameters.

The pre-training may be based on an assumption that ranges of values in the secondary neural networks change sufficiently slowly, such that exponents can be predicted with high accuracy based on historical trends. If the input data is independently and identically distributed, tensors in the primary neural network, such as weights, activations and deltas, will have slowly changing exponents. The pre-training based on heuristic parameters tracks the maximum absolute value of the mantissa of every tensor, with a bounded history of these values. Based on the bounded history of values, the secondary neural networks curve fit a trend in the values and determine a balance, by adjustment of the exponent, of overflow prevention and maximum absolute values of the mantissa to better utilize the available range of numbers represented by the flex-point number. In many embodiments, the floating-point value of the maximum absolute value of a tensor is the maximum absolute value multiplied by the exponent, which is $2^{-e}$. If the same tensor is reused for different computations in the network, each exponent e and the statistics of the floating-point representation separately for each use.

The tensor may be a subset of parameters within a given layer that have a shared exponent value. The subset of parameters may include, for example, weights that make up the filters for the layer, biases, outputs from corresponding layers, outputs to corresponding layers, and/or the like.

Figure 1B:
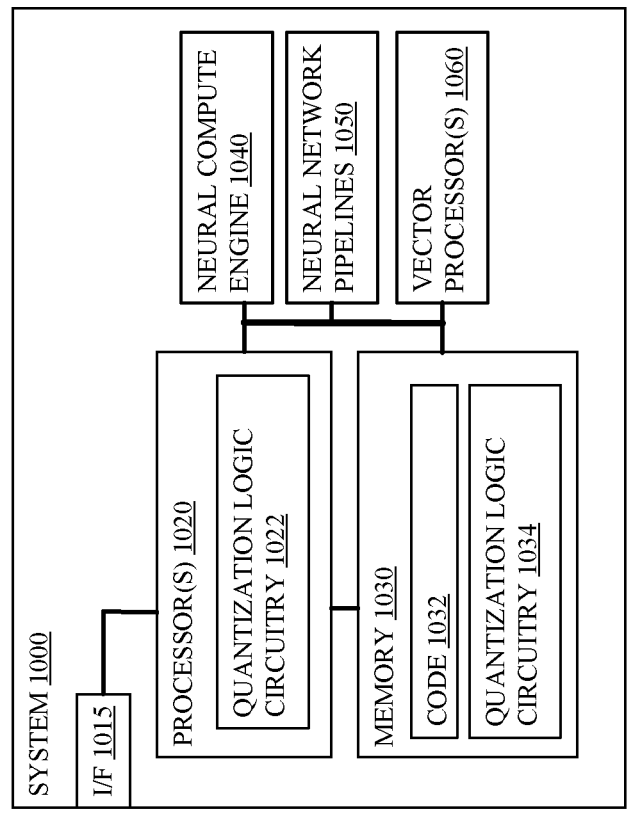
FIGS. 1B-C depict embodiments of a primary neural network with secondary neural networks to generate quantization parameters such as the quantization logic circuitry illustrated in FIG. 1A.
Figure 1C:
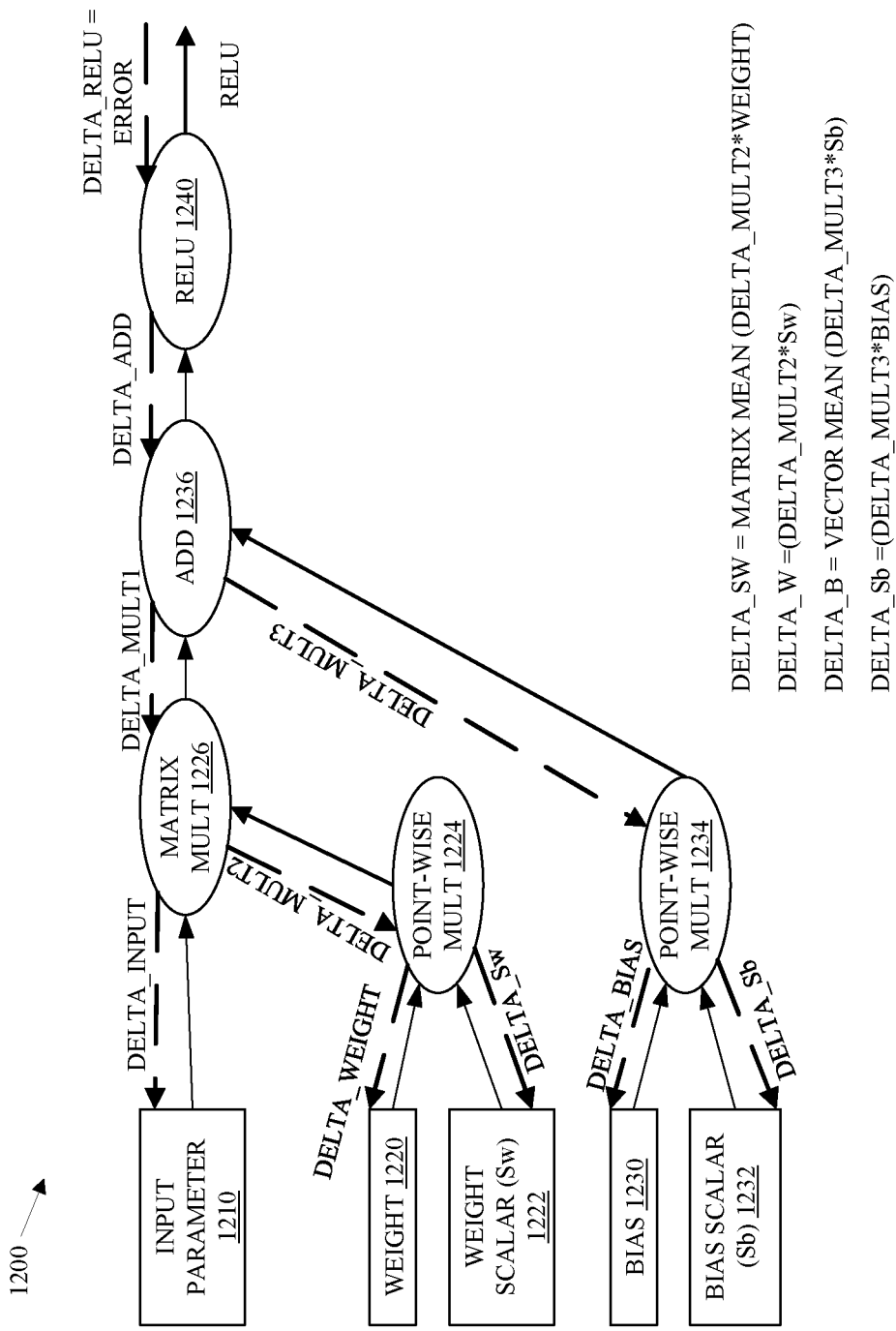

FIGS. 1B-C embodiments of a primary neural network with secondary neural networks to generate quantization parameters such as the quantization logic circuitry 1022 and 1034 illustrated in FIG. 1A. FIG. 1B depicts a primary neural network (NN), such as the primary DNN in FIG. 1A, represented by an input layer 1110, and three or more layers 1120 and 1130 through 1140. The secondary neural networks (SNNs) are represented by SNN 1115 and SNN 1125 through SNN 1135. While FIG. 1B illustrates one SNN per layer of the primary DNN, some embodiments may include more than one SNN per layer of the primary NN. For instance, some embodiments may include an SNN for each tensor in each layer of the primary NN such as three SNNs per layer. The implementation of a single SNN per layer to output the same exponent for all the tensors in the layer may advantageously simplify computations to effectively fixed-point computations. The implementation of a multiple SNNs per layer to output different exponents for one or more tensors in the layer and/or one or more sets of tensors in the layer may advantageously increase precision and/or the dynamic range of computations in the layer.

The SNNs 1115 and 1125 through 1135 may comprise small neural networks such as multi-layer perceptron neural networks (MLPs), recursive neural networks (RNNs), other feedforward neural networks, recurrent neural networks, and/or the like. In some embodiments, the input to the SNNs 1115 and 1125 through 1135 may be the distributions of the corresponding tensors from the current, primary NN layer over a time window. Such an approach may require a recursive connection from the primary NN layer to the SNN and back. This may be hard to train as compared to a feedforward neural network.

FIG. 1B illustrates one approximation is that uses the distribution of the tensors in the prior layer as a proxy for tensors in the current layer. This has the benefit of preserving the feedforward nature of the composite network. Other embodiments may implement alternative approximations to provide a feedforward neural network. This overall structure allows the primary NN and the SNNs 1115 and 1125 through 1135 to be jointly trained on hardware. As the SNNs 1115 and 1125 through 1135 converge, they may produce scale factors that jointly minimize the objective function driving the primary NN.

The input layer 1110 may comprise input data that is training data for the primary NN. In many embodiments, the input data is not modified by backpropagation. The first SNN(s) represented by SNN 1115 may receive the input data as an input and generate an output as a scalar multiplier to the first computational layer, layer 1120, of the primary NN. The layer 1120 may compute an output and the output of the layer 1120 is passed to the input of SNN 1125 as well as the input of layer 1130. The SNN 1125 may determine an exponent as a scalar multiplier and output the scalar multiplier to the layer 1130. Layer 1130 may determine an output based on the input from layer 1120 and the scalar multiplier from the SNN 1125 and pass the output to the next layer.

The last SNN 1135 may receive the output from the previous layer such as a layer between layers 1130 and 1140, and may generate a scalar multiplier as an output to the layer 1140 and the layer 1140 may receive the scalar multiplier as an exponent or scalar multiplier for weights and biases within tensors of the layer 1140. The layer 1140 may generate an output and pass the output to an objective function logic circuitry 1150. The objective function logic circuitry 1150 may determine errors in the output from the layer 1140 of the primary NN based on an objective function such as a comparison of the expected output against the actual output. For instance, the expected output may be paired with the input in the training data supplied for the primary NN for supervised training.

The objective function logic circuitry 1150 may output errors to backpropagation logic circuitry 1155 to backpropagate the errors through the primary NN and, in some embodiments, through the SNNs. For instance, the objective function logic circuitry 1150 may output the errors in the form of a gradient of the objective function with respect to the parameters of the primary NN.

The backpropagation logic circuitry 1155 may propagate the gradient of the objective function from the top-most layer, layer 1140, to the bottom-most layer, layer 1120 using the chain rule. The chain rule is a formula for computing the derivative of the composition of two or more functions. That is, if f and g are functions, then the chain rule expresses the derivative of their composition f∘g (the function which maps x to f(g(x))) in terms of the derivatives of f and g. After the objective function logic circuitry 1150 computes the errors, backpropagation logic circuitry 1155 backpropagates the errors. The backpropagation is illustrated with the dashed arrows.

For embodiments in which the SNNs operating in inferential mode, the SNNs 1115 and 1125 through 1135 are pretrained and are not trained via the backpropagation. In such embodiments, the backpropagation may only adjust the parameters of the primary NN. However, in some embodiments, the training logic may measure statistics related to the primary NN related to the parameters on which the SNNs are pretrained so the SNNs can further improve the pretraining on the specific statistics of additional models.

For embodiments in which the SNNs 1115 and 1125 through 1135 are training concurrently with the primary NN, the backpropagation logic circuitry 1155 may backpropagate the errors through the SNNs 1115 and 1125 through 1135. Since the SNNs 1115 and 1125 through 1135 comprise of trainable neural networks (also known as differentiable functions), they can be trained using the same gradient of the objective function as the primary NN layers.

FIG. 1C illustrates an embodiment 1200 of forward-feeding computations and backpropagation of errors for one parameter in a layer of a neural network such the primary NN illustrated in FIG. 1B. The parameter is an input parameter 1210 from a prior layer or an input layer. The layer performs computations with the input parameter 1210, a weight 1220, a weight scalar multiplier (Sw) 1222, a bias 1230, and a bias scalar multiplier (Sb) 1232. The weight scalar multiplier (Sw) and the bias scalar multiplier (Sb) are pretrained or trainable outputs from the SNNs such as the SNNs 1115 and 1125 through 1135 shown in FIG. 1B. For SNNs that train concurrently with the primary NN, the weight scalar multiplier (Sw) and the bias scalar multiplier (Sb) are trainable via the objective function of the primary NN by backpropagating the errors through the SNN(s) that provide the scalar multipliers Sw and Sb as inputs.

The forward-feeding computations multiply, with point-wise multiplication 1224, the weight 1220 with the weight scalar multiplier (Sw) 1232 and multiply the input parameter 1210 with the product of the weight 1220 with the weight scalar multiplier (Sw) 1232 with matrix multiplication 1226. The computations multiply, with point-wise multiplication 1234, the bias 1230 with the bias scalar multiplier (Sb) 1232 and add 1236 this product to the output of the matrix multiplication 1226. Thereafter, the forward-feeding computations convolve the output of the add 1226 with a non-linear function such as a rectified linear unit (ReLU) 1240 to the output of the parameter. The output may pass to the input a subsequent layer and a subsequent SNN or may pass to the input of an objective function logic circuitry such as the objective function logic circuitry 1150 shown in FIG. 1B.

After the objective function logic circuitry computes the errors, the backpropagation logic circuitry backpropagates errors. The backpropagation for this one parameter is illustrated with the dashed arrows. The parameter receives a delta_relu which is the difference based on the gradient of the objective function in the output from the ReLU 1240 and the expected output. The backpropagation logic circuitry applies the delta_relu to ReLU 1240, which determines a delta_add to change the result of the add 1236 based on the errors. The delta_add backpropagates delta_mult1 to matrix multiplication 1226 and delta_mult3 to point-wise multiplication 1234. The point-wise multiplication 1234 backpropagates delta_bias to modify the bias 1230 and delta_Sb to the SNN that determines the bias scalar (Sb) to adjust the SNN based on backpropagation of the errors determined from the objective function of the primary NN.

The matrix multiplier 1226 backpropagates delta_input to the input parameter 1210 to modify the input parameter and to backpropagate to a prior layer if this is not the first layer. The matrix multiplier 1226 backpropagates delta_mult2 to the point-wise multiplier 1224. The point-wise multiplication 1224 backpropagates delta_weight to modify the weight 1220 and delta_Sw to the SNN that determines the weight scalar (Sw) to adjust the SNN based on backpropagation of the errors determined from the objective function of the primary NN. Note that the delta_Sw may be the matrix mean of delta_mult2*weight, delta_weight may be delta_mult2*Sw, delta_bias may be the vector mean of delta_mult3*Sb, and the delta_Sb may be delta_mult3*bias. Note also that embodiments may round tensor scales such that the scalar multiplier for the weight is $2^{\lceil log(Sw) \rceil}$ and the scalar multiplier (or scale factor) for the bias 1230 is $2^{\lceil log(Sb) \rceil}$.

Note that each component described as "logic circuitry" or is a subcomponent of "logic circuitry" can also be described as a "functional block" such as "neural network logic circuitry", which can be described as a "functional block". Similarly, primary neural network logic circuitry can be referred to as a primary "functional block", secondary neural network logic circuitry can be referred to as a secondary "functional block", and quantization logic circuitry may be referred to as a quantization "functional block".

Figure 2:
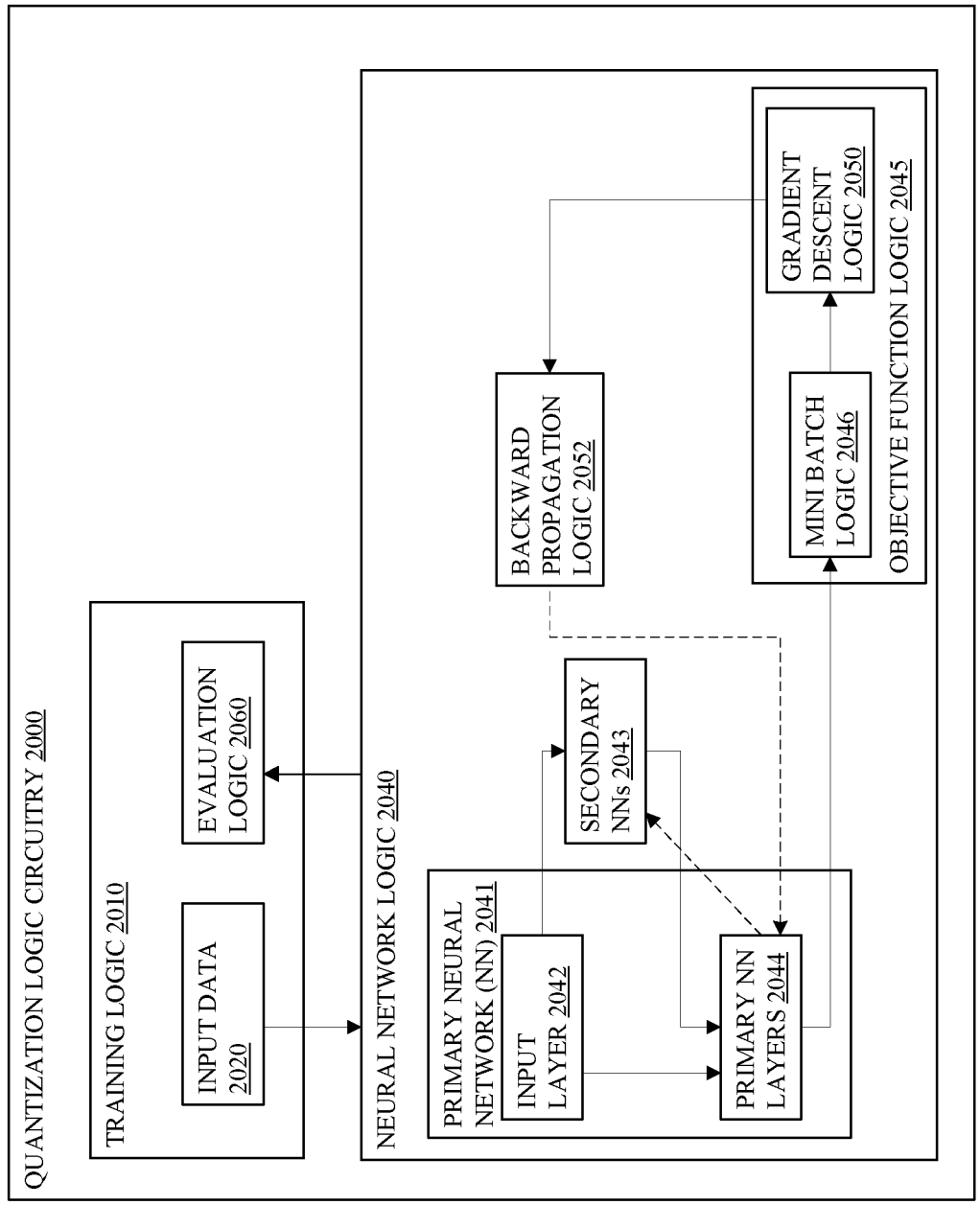
FIG. 2 depicts an embodiment of quantization logic circuitry such as the quantization logic circuitry shown in FIGS. 1A-C.

FIG. 2 depicts an embodiment of a quantization logic circuitry 2000. The quantization logic circuitry 2000 may comprise data to train a primary neural network 2041. The quantization logic circuitry 2000 may comprise circuitry; a combination of circuitry, code, and a processor to execute the code; or a combination of code and a processor to execute the code. For instance, the quantization logic circuitry 2000 may comprise a state machine and/or application-specific integrated circuit (ASIC) to perform some or all the functionality of the quantization logic circuitry 2000. In some embodiments, the quantization logic circuitry 2000 may also comprise supervised data to pretrain the secondary neural networks (NNs) 2043.

The quantization logic circuitry 2000 may train the primary neural network logic 2041 to calculate a set of the best or optimal policies for determination of tensor exponents for the layers of the primary NN 2041 and select the best or optimal policy for determining the exponents for the tensors for any input data based on the set of optimal policies. The quantization logic circuitry 2000 may comprise a training logic 2010 and a neural network logic 2040.

The training logic 2020 may comprise input data 2020 that is training data to identify multiple policies for determining exponents for tensors in the primary NN 2041 and may transfer the training data to an input layer 2042 of the primary neural network logic 2041 of the neural network logic 2040.

The training logic 2020 may include evaluation logic 2024 and may receive feedback from the neural network logic 2040 to indicate an evaluation score for one or more policies. The evaluation logic 2024 may evaluate an output generated by the primary NN 2041 based on a set of the input data that is not provided as training data to evaluate the performance of the primary NN 2041. For instance, the user or developer of the primary NN 2041 may provide input data to measure metrics of the output to evaluate progress of the training of the primary NN 2041.

In some embodiments, the evaluation logic 2024 may determine or measure metrics related to an objective function. The evaluation logic 2024 may also determine evaluation scores or communicate with the neural network logic 2040 to determine evaluation scores based on an approximated value function to provide an indication of ranking of a policy in relation to other policies.

The neural network logic 2040 may comprise a deep neural network that implements dynamic programming to determine and solve for an approximated value function. The primary NN 2041 may receive the training data at the input layer 2042, train based on the training data to select and evaluate a set of optimal policies, and identify an optimal policy from the set of optimal policies. The neural network logic 2040 may comprise the input layer 2042, secondary NNs 2043, one or more primary NN layers 2044, an objective function logic 2045, and a backward propagation logic 2052.

The input layer 2042 may include the training data comprising multiple discrete-time states associated with actions and a reward as a control variable. In some embodiments, the input layer 2042 may include additional control variables such as one or more metrics related to the objective. The input layer 2042 may pass the training data to an input of the secondary NNs 2043 and an input of the primary NN layers 2044.

The secondary NNs 2043 may comprise multiple-parameter neural networks such as multiple-layer perceptron networks or recurrent neural networks. In other embodiments, the secondary NNs 2043 may comprise single-parameter neural networks. Furthermore, the secondary NNs 2043 may be pretrained or may train jointly with the primary NN 2041 based on the same objective or loss function as the primary NN 2041 via backpropagation of errors through the secondary NNs 2043.

The secondary NNs 2043 may receive the training data as input data from the input layer 2042 and determine or generate an output scalar multiplier that represents an exponent for the weight and/or bias of a tensor in one or more of the primary NN layers 2044. The output of the secondary NNs 2043 passes to the input of the primary NN layers 2044 similar to the FIG. 1B. In many embodiments, the neural network logic 2040 comprises one secondary NN 2043 for each tensor in each layer. In some embodiments, the neural network logic 2040 comprises one secondary NN 2043 for all tensors in one of the primary NN layers 2044. And, in some embodiments, the neural network logic 2040 comprises one secondary NN 2043 for each set of one or more sets of tensors in one layer of the primary NN layers 2044 where a set can include one or more tensors.

The primary NN layers 2044 may comprise layers of the primary NN 2041 that include one or more functions as well as weights and biases and scalar multipliers for the weights and biases. The functions may convolve with iterations of errors or differences determined via the objective function logic 2045 and backpropagated via the backward propagation logic 2052. In many embodiments, the primary NN layers 2044 associate a weight and bias with each input parameter as well as control parameters from the input layer 2042. The training data in the input layer 2042 may remain unchanged while the primary NN layers 2044 incrementally adjust the weights and biases. Furthermore, for secondary NNs 2043 that train concurrently with the primary NN 2041, the secondary NNs 2043 may incrementally adjust the scalar multipliers for the weights and the scalar multipliers for the biases based on the backpropagation.

In some embodiments, the primary NN layers 2044 include a pre-activation function that applies an equation to the values from the input layer. In some embodiments, the primary NN layers 2044 includes an activation function that applies an equation to the values from the input layer 2042 and the weights and biases before passing these to the objective function logic 2045.

The objective function logic 2045 may comprise logic circuitry to evaluate the output from the primary NN 2041 to the objective function of the primary NN 2041. The objective function logic 2045 may comprise a mini-batch logic 2046 and a gradient descent logic 2050. The mini-batch logic 2046 may select a smaller collection of n samples, where n is referred to as batch size, of the training data. For example, if the batch size n=100, the mini-batch logic 2046 may selectively pass 100 randomly selected training data from the input layer in each iteration, filtered through the primary NN layers 2044, to the gradient descent logic 2050. The number of iterations in each epoch is N/n, where N is the number of total training samples. The gradient descent logic 2050 may perform a gradient descent with each of the n batch of training samples, or N/n iterations of gradient descent, to estimate the gradient of the approximated value function.

The gradient descent logic 2050 may perform an incremental gradient descent that is an approximation of the gradient descent optimization method for minimizing the approximated value function in the form of a sum of differentiable functions. In other words, the gradient descent logic 2050 may find minima by iteration.

The backward propagation logic 2052 may backpropagate (shown with the dashed arrows) the correction or errors output from the gradient decent through the activation functions of the primary NN layers and apply the correction or error to the weights and biases in the primary NN layers 2044. If training concurrently, backward propagation logic 2052 may also backpropagate the correction or errors output through layers of the secondary NNs 2043. In some embodiments, the backward propagation logic 2052 may backpropagate the correction or error through the primary NN layers 2044 and, if training concurrently, layers of the secondary NNs 2043, after each iteration of the gradient descent. In other embodiments, the backward propagation logic 2052 may backpropagate the correction or error through the primary NN layers 2044 and, if training concurrently, layers of the secondary NNs 2043, after every x number of iterations of gradient descent.

Once the values converge for the approximated value function, the neural network 2040 may identify the optimal approximated value functions, which are associated with policies, and, thus can identify the optimal policies. The secondary NNs 2043 may calculate the initial states for each of the optimal policies by regressively calculating each prior state starting from the final state in each of the policies, and, thereafter, determine an optimal policy for determining the exponents or scalar multipliers for each layer of the primary NN 2041 by comparing the input data for that layer against the initial states of the optimal policies.

Figure 3B:
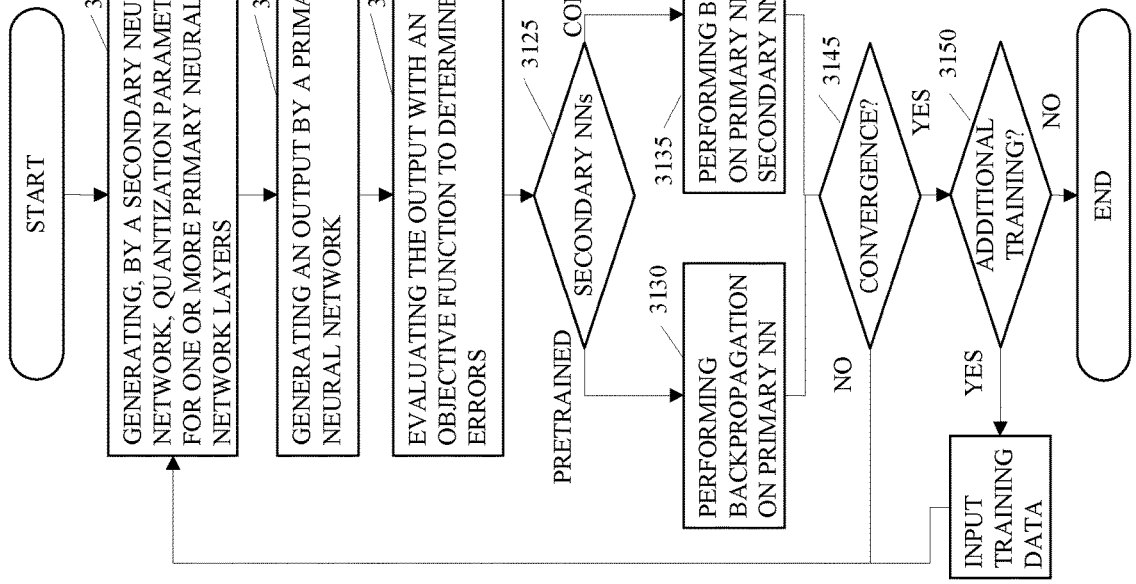
FIGS. 3A-B depict flowcharts of embodiments to receive training data and a primary neural network and train a primary neural network concurrently with secondary neural networks or with the secondary neural networks in inference mode.
Figure 3A:
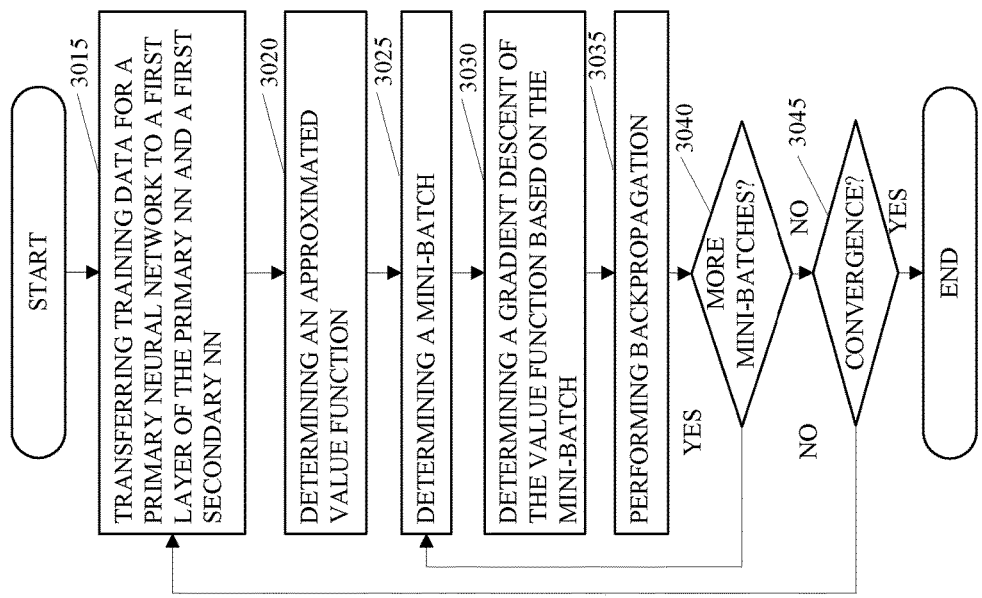

FIGS. 3A-C depict flowcharts of embodiments to receive training data and a primary neural network and train a primary neural network concurrently with secondary neural networks or with the secondary neural networks in inference mode. FIG. 3A illustrates a flowchart to train a primary neural network based on training data. The flowchart starts with the quantization logic circuitry may transferring training data for a neural network (element 3015). The quantization circuitry logic may comprise training logic such as the training logic 2010 in FIG. 2 to receive the training data and pass the training data to the inputs of a first layer in the primary NN and a first secondary NN (or first set of secondary NNs if there are more than on secondary NNs per layer). For instance, the quantization logic circuitry may associate instances or subsets of the training data with different policies. The exponent that each secondary NN determines based on the input data may represent a policy. The objective function can evaluate that policy and back-propagation can incrementally improve the policy by adjusting parameters, weights, biases, and scalar multipliers (exponents). In some embodiments, the training logic may track the different policies, execute the instances associated with each of the policies, and store the discrete time values for each state and action associated with a policy along with an actual reward associated with the objective function.

After transferring the training data, the quantization logic circuitry may determine an approximated value function (element 3020) by applying weights and biases to parameters in the secondary NN (if training jointly with the primary NN) and in one or more layers of the primary NN. The neural network logic circuitry may then determine a mini-batch of training samples (element 3025) and pass the mini-batch of samples to a gradient descent logic of the neural network logic circuitry.

The neural network logic circuitry may determine a gradient descent of the approximated value function based on the mini-batch (element 3030) and perform backpropagation (element 3035) to backpropagate the output of the gradient descent through the primary NN layer and, if training concurrently with the primary NN, through the layers of the secondary NNs. If there are additional mini-batches available in the epoch to process (element 3040), the flowchart returns to element 3025 to determine the next mini-batch. If there are no more mini-batches in the epoch, the quantization logic circuitry may determine if the approximated value functions of the optimal policies have converged (element 3045). If the functions have not converged then the neural network logic may require additional training and the flowchart returns to element 3015. On the other hand, if the functions have converged, the training of the neural network logic may be complete.

FIG. 3B illustrates a flowchart for training a primary neural network by generating quantization parameters with set of secondary neural networks of quantization logic circuitry, such as the quantization logic circuitry 2000 in FIG. 2 and the quantization logic circuitry 1022 in FIG. 1A. The flowchart begins with generating by one or more secondary neural networks, quantization parameters for one or more layers of the primary neural network (element 3110). A set of one or more secondary neural networks may receive input data from an input layer of the primary neural network or another immediately preceding layer of the primary neural network and generate an exponent for one or more tensors or sets of tensors in current layer of the primary neural network. In some embodiments, the secondary neural network is pretrained via predictive parameters such as heuristic parameters including the maximum absolute value of the mantissa, an overflow control parameter, a maximum absolute value history, an exponent history, a type of tensor, a type of following tensor, a type of kernel being activated in the primary neural network layer, a place of a tensor within the primary neural network, a number of the epoch, a number of the iteration, and/or the like.

In many embodiments, the set of one or more secondary neural networks output one or more scalar multipliers to the current layer of the primary neural network and the primary neural network outputs data in the form of tensors to the next layer up in the primary neural network until the last layer.

After the sets of secondary neural networks determine output exponents to each of the layers of the primary neural network, the output layer (uppermost layer) of the primary neural may generate an output for evaluation by an objective function of the primary neural network (element 3115) to backpropagate a gradient of the objective function through the layers of the primary and secondary neural networks. An objective function logic circuitry may compare the output to an expected output to determine errors associated with the output. In many embodiments, the errors are in the form of a gradient of the objective function for the primary network based on the output.

If the secondary neural networks are pretrained (element 3125), the quantization logic circuitry may not backpropagate the errors through the secondary neural networks but may backpropagate the errors through the primary neural network (element 3130). In further embodiments, training logic may measure statistics related to the primary neural network such as the parameters on which the secondary neural networks are pretrained and improve layers of the secondary neural networks by training on the specific statistics of the new model.

If the secondary neural networks train concurrently with the primary neural network (element 3125), the quantization logic circuitry may backpropagate the errors through the primary neural network and through the secondary neural networks (element 3130).

The quantization logic circuitry may determine a gradient descent for the training data and update the weights and biases for all the policies based on the results and, in some embodiments, the scalar multipliers for the weights and biases. In the present embodiment, the quantization logic circuitry performs stochastic gradient descent by computing the gradient against more than one training example at each step. This technique is also called mini-batch. At each iteration, a mini-batch logic may determine a batch of training data, which refers to the number of training data, or policies, involved during the training process. For instance, after several iterations, each iteration involving different samples of the training data, one or more of the policies will converge (element 3145) and the quantization logic circuitry may identify the converged policies as optimal policies.

If the quantization logic circuitry determines that additional policies should be created from the training data (element 3150) such as to meet a minimum number of policies, the flowchart passes more input data to the input layer of the primary neural network and returns to element 3110. Otherwise, the training ends.

Figure 4:
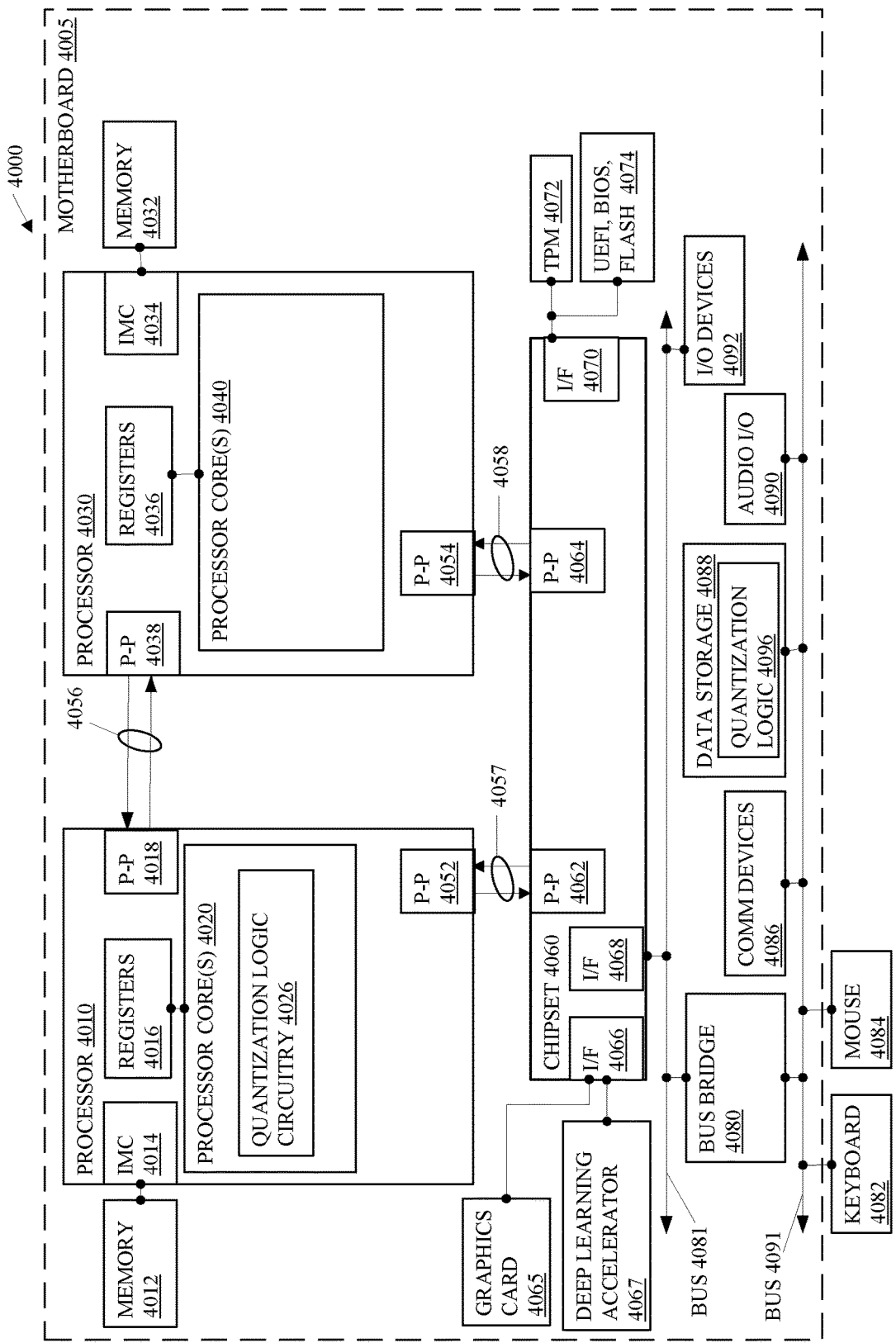
FIG. 4 depicts an embodiment of a system comprising quantization logic circuitry such as the quantization logic circuitry shown in FIGS. 1A-C and 2.

FIG. 4 illustrates an embodiment of a system 4000. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 4, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interfaces 4018 and 4052. Similarly, the second processor 4030 includes an IMC 4034 and P-P interfaces 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. In the present embodiment, the processor core(s) 4020 of the processor 4010 include a quantization logic circuitry 4026 such as the memory management logic circuitry 1022 shown in FIGS. 1A-B. The quantization logic circuitry 4026 may represent circuitry configured to implement the functionality to train primary neural networks for neural network support within the processor core(s) 4020 or may represent a combination of the circuitry within a processor and a medium to store all or part of the functionality of the quantization logic circuitry 4026 in memory such as cache, the memory 4012, buffers, registers, and/or the like. In several embodiments, the functionality of the quantization logic circuitry 4026 resides in whole or in part as code in a memory such as the quantization logic 4096 in the data storage 4088 attached to the processor 4010 via a chipset 4060 such as the quantization logic circuitry 1022 and 1034 shown in FIGS. 1A-B. The functionality of the quantization logic circuitry 4026 may also reside in whole or in part in memory such as the memory 4012 and/or a cache of the processor. Furthermore, the functionality of the quantization logic circuitry 4026 may also reside in whole or in part as circuitry within the processor 4010 and may perform operations, e.g., within registers or buffers such as the registers 4016 within the processor 4010, or within an instruction pipeline of the processor 4010.

In other embodiments, more than one of the processors 4010 and 4030 may comprise functionality of the quantization logic circuitry 4026 such as the processor 4030 and/or the processor within the deep learning accelerator 4067 coupled with the chipset 4060 via an interface (I/F) 4066. The I/F 4066 may be, for example, a Peripheral Component Interconnect-enhanced (PCI-e).

The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an input/output (I/O) controller hub.

In the present embodiment, the chipset 4060 couples with a trusted platform module (TPM) 4072 and the UEFI, BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065. In other embodiments, the system 4000 may include a flexible display interface (FDI) between the processors 4010 and 4030 and the chipset 4060. The FDI interconnects a graphics processor core in a processor with the chipset 4060.

Various I/O devices 4092 couple to the bus 4081, along with a bus bridge 4080 which couples the bus 4081 to a second bus 4091 and an I/F 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086 and a data storage unit 4088 that may store code such as the compiler 4096. Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005.

Figure 5:
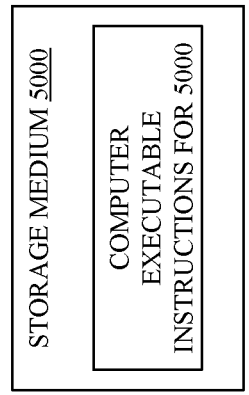
FIGS. 5-6 depict embodiments of a storage medium and a computing platform.

FIG. 5 illustrates an example of a storage medium 4000 to store processor data structures. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
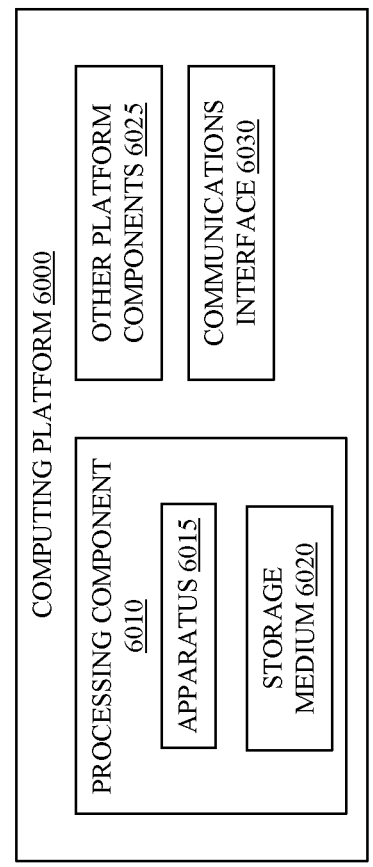

FIG. 6 illustrates an example computing platform 5000. In some examples, as shown in FIG. 6, computing platform 6000 may include a processing component 6010, other platform components or a communications interface 5030. According to some examples, computing platform 6000 may be implemented in a computing device such as a server in a system such as a data center or server farm that supports a manager or controller for managing configurable computing resources as mentioned above. Furthermore, the communications interface 6030 may comprise a wake-up radio (WUR) and may be capable of waking up a main radio of the computing platform 6000.

According to some examples, processing component 6010 may execute processing operations or logic for apparatus 5015 described herein. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included or omitted in various embodiments of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 6000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

Several embodiments have one or more potentially advantages effects. For instance, generating, by a secondary neural network logic circuitry for a primary neural network logic circuitry, quantization parameters advantageously optimize quantization parameters. The secondary neural network logic circuitry comprising one or more secondary neural networks trainable with the objective function to output the quantization parameters to the tensors advantageously facilitates generation of quantization parameters based on the same objective and objective function. Training the secondary neural networks via the objective function of the primary neural network while training the primary neural network via backpropagation advantageously optimizes quantization parameters based on the same objective and objective function. The secondary neural network logic circuitry is trained prior to training the primary neural network via a heuristic parameters and supervised learning advantageously optimizes quantization parameters through machine learning. The secondary neural network logic circuitry to generate a quantization parameter for one or more tensors in each layer of the multiple layers of the primary neural network advantageously optimizes quantization parameters through machine learning or multiple tensors. A first secondary neural network of the secondary neural networks comprises an input to receive an input of the primary neural network and an output coupled with an input of a first layer of the primary neural network; and a second neural network of the secondary neural networks comprises an input coupled with an output of the first layer of the primary neural network and an output coupled with an input of a second layer of the primary neural network, advantageously provides a feed forward deep neural network.

EXAMPLES OF FURTHER EMBODIMENTS

The following examples pertain to further embodiments. Specifics in the examples may be used anywhere in one or more embodiments.

Example 1 is an apparatus to quantize a neural network, the apparatus comprising: a primary neural network logic circuitry to generate an output; and a secondary neural logic circuitry coupled with the primary neural network logic circuitry to receive an input; to generate for the primary neural network logic circuitry, quantization parameters, wherein the primary neural network logic circuitry comprises a primary neural network with multiple layers trainable with an objective function, wherein each of the multiple layers of the primary neural network comprises multiple tensors, wherein the secondary neural network logic circuitry comprises one or more secondary neural networks trainable with the objective function to output the quantization parameters to the tensors. In Example 2, the apparatus of Example 1, further comprising backpropagation logic to train the secondary neural networks with the objective function concurrently with the primary neural network via backpropagation. In Example 3, the apparatus of Example 1, wherein the secondary neural network logic circuitry is trained prior to training the primary neural network via a heuristic parameters and supervised learning. In Example 4, the apparatus of Example 1, wherein the secondary neural networks comprise one or more recurrent neural networks. In Example 5, the apparatus of Example 1, wherein the secondary neural networks comprise one or more multilayer perceptron neural networks. In Example 6, the apparatus of Example 1, the secondary neural network logic circuitry to generate a quantization parameter for one or more tensors in each layer of the multiple layers of the primary neural network. In Example 7, the apparatus of Example 6, the secondary neural network to generate a quantization parameter for each tensor in at least one layer of the multiple layers of the primary neural network. In Example 8, the apparatus of Example 6, the secondary neural network logic circuitry to generate a quantization parameter for all tensors in at least one layer of the multiple layers of the primary neural network. In Example 9, the apparatus of Example 8, wherein the quantization parameter comprises one or more scalar multipliers for a floating-point number of a tensor in at least one layer of the multiple layers of the primary neural network and the at least one layer to perform computations with tensors as fixed-point numbers. In Example 10, the apparatus of Example 6, the secondary neural network logic circuitry to generate a quantization parameter for one or more sets of tensors in at least one layer of the multiple layers of the primary neural network. In Example 11, the apparatus of Example 1, wherein the one or more secondary neural networks output the quantization parameters comprising one or more scalar multipliers for a floating-point number of a tensor in at least one layer of the multiple layers of the primary neural network. In Example 12, the apparatus of Example 11, wherein the one or more scalar multipliers for the tensor comprise a first scale factor for a weight of a tensor and a second scale factor for a bias of the tensor. In Example 13, the apparatus of Example 1, wherein the one or more secondary neural networks comprise single-parameter neural networks or multiple parameter neural networks. In Example 14, the apparatus of Example 1, further comprising evaluation logic coupled with the primary neural network logic circuitry to receive the output of the primary neural network logic circuitry and to determine errors in the output of the primary neural network logic circuitry via the objective function; and backpropagation logic to backpropagate the errors through the primary neural network logic circuitry to train the primary neural network logic circuitry. In Example 15, the apparatus of Example 1, further comprising backpropagation logic to backpropagate the errors to incrementally converge to an approximated value function of the primary neural network based on the objective function. In Example 16, the apparatus of Example 1, further comprising backpropagation logic to backpropagate the errors to incrementally converge to an approximated value function of the secondary neural networks based on the objective function. In Example 17, the apparatus of Example 1, wherein a first secondary neural network of the secondary neural networks comprises an input to receive an input of the primary neural network and an output coupled with an input of a first layer of the primary neural network; and a second neural network of the secondary neural networks comprises an input coupled with an output of the first layer of the primary neural network and an output coupled with an input of a second layer of the primary neural network.

Example 18 is a method to quantize a neural network, the method comprising: receiving an input; generating, by a secondary neural network logic circuitry for a primary neural network logic circuitry, quantization parameters, wherein the primary neural network logic circuitry comprises a primary neural network with multiple layers trainable with an objective function, wherein each of the multiple layers of the primary neural network comprises multiple tensors, wherein the secondary neural network logic circuitry comprises one or more secondary neural networks trainable with the objective function to output the quantization parameters to the tensors; and generating, by a primary neural network logic circuitry, an output. In Example 19, the method of Example 18, further comprising training the secondary neural networks via the objective function of the primary neural network while training the primary neural network via backpropagation. In Example 20, the method of Example 18, wherein the secondary neural network logic circuitry is trained prior to training the primary neural network via a heuristic parameters and supervised learning. In Example 21, the method of Example 18, wherein the secondary neural networks comprise one or more recurrent neural networks. In Example 22, the method of Example 18, wherein the secondary neural networks comprise one or more multilayer perceptron neural networks. In Example 23, the method of Example 18, the secondary neural network logic circuitry to generate a quantization parameter for one or more tensors in each layer of the multiple layers of the primary neural network. In Example 24, the method of Example 23, the secondary neural network to generate a quantization parameter for each tensor in at least one layer of the multiple layers of the primary neural network. In Example 25, the method of Example 23, the secondary neural network logic circuitry to generate a quantization parameter for all tensors in at least one layer of the multiple layers of the primary neural network. In Example 26, the method of Example 25, wherein the quantization parameter comprises one or more scalar multipliers for a floating-point number of a tensor in at least one layer of the multiple layers of the primary neural network and the at least one layer performs computations with tensors as fixed-point numbers. In Example 27, the method of Example 23, the secondary neural network logic circuitry to generate a quantization parameter for one or more sets of tensors in at least one layer of the multiple layers of the primary neural network. In Example 28, the method of Example 18, wherein the one or more secondary neural networks output the quantization parameters comprising one or more scalar multipliers for a floating-point number of a tensor in at least one layer of the multiple layers of the primary neural network. In Example 29, the method of Example 28, wherein the one or more scalar multipliers for the tensor comprise a first scale factor for a weight of a tensor and a second scale factor for a bias of the tensor. In Example 30, the method of Example 18, wherein the one or more secondary neural networks comprise single-parameter neural networks or multiple parameter neural networks. In Example 31, the method of Example 18, wherein the one or more secondary neural networks comprise multiple-parameter neural networks. In Example 32, the method of Example 18, further comprising backpropagation of the errors to incrementally converge to the approximated value function based on the objective function of the primary neural network logic circuitry. In Example 33, the method of Example 18, further comprising backpropagation of the errors to incrementally converge to the approximated value function of the secondary neural networks based on the objective function of the primary neural network. In Example 34, the method of Example 18, wherein a first secondary neural network of the secondary neural networks comprises an input to receive an input of the primary neural network and an output coupled with an input of a first layer of the primary neural network; and a second neural network of the secondary neural networks comprises an input coupled with an output of the first layer of the primary neural network and an output coupled with an input of a second layer of the primary neural network.

Example 35 is a system to quantize a neural network, the system comprising: a memory comprising dynamic random-access memory; an integrated circuit comprising: a primary functional block to generate an output; and a secondary functional block coupled with the primary functional block to receive an input; to generate for the primary functional block, quantization parameters, wherein the primary functional block comprises a primary neural network with multiple layers trainable with an objective function, wherein each of the multiple layers of the primary neural network comprises multiple tensors, wherein the secondary functional block comprises one or more secondary neural networks trainable with the objective function to output the quantization parameters to the tensors. In Example 36, the system of Example 35, further comprising backpropagation logic circuitry to train the secondary neural networks with the objective function concurrently with the primary neural network via backpropagation. In Example 37, the system of Example 35, wherein the secondary functional block is trained prior to training the primary neural network via a heuristic parameters and supervised learning. In Example 38, the system of Example 35, wherein the secondary neural networks comprise one or more recurrent neural networks or one or more multilayer perceptron neural networks. In Example 39, the system of Example 35, wherein the secondary neural networks comprise evaluation logic circuitry coupled with the primary functional block to receive the output of the primary functional block and to determine errors in the output of the primary functional block via the objective function; and backpropagation logic circuitry to backpropagate the errors through the primary functional block to train the primary neural network logic circuitry. In Example 40, the system of Example 35, the secondary functional block to generate a quantization parameter for one or more tensors in each layer of the multiple layers of the primary neural network. In Example 41, the system of Example 40, the secondary neural network to generate a quantization parameter for each tensor in at least one layer of the multiple layers of the primary neural network. In Example 42, the system of Example 40, the secondary functional block to generate a quantization parameter for all tensors in at least one layer of the multiple layers of the primary neural network. In Example 43, the system of Example 42, wherein the quantization parameter comprises one or more scalar multipliers for a floating-point number of a tensor in at least one layer of the multiple layers of the primary neural network and the at least one layer to perform computations with tensors as fixed-point numbers. In Example 44, the system of Example 40, the secondary functional block to generate a quantization parameter for one or more sets of tensors in at least one layer of the multiple layers of the primary neural network. In Example 45, the system of Example 35, wherein the one or more secondary neural networks output the quantization parameters comprising one or more scalar multipliers for a floating-point number of a tensor in at least one layer of the multiple layers of the primary neural network. In Example 46, the system of Example 45, wherein the one or more scalar multipliers for the tensor comprise a first scale factor for a weight of a tensor and a second scale factor for a bias of the tensor. In Example 47, the system of Example 35, wherein the one or more secondary neural networks comprise single-parameter neural networks or multiple parameter neural networks. In Example 48, the system of Example 35, wherein the one or more secondary neural networks comprise multiple-parameter neural networks. In Example 49, the system of Example 35, further comprising backpropagation logic circuitry to backpropagate the errors to incrementally converge to an approximated value function of the primary neural network based on the objective function. In Example 50, the system of Example 35, further comprising backpropagation logic circuitry to backpropagate the errors to incrementally converge to an approximated value function of the secondary neural networks based on the objective function. In Example 51, the system of Example 35, wherein a first secondary neural network of the secondary neural networks comprises an input to receive an input of the primary neural network and an output coupled with an input of a first layer of the primary neural network; and a second neural network of the secondary neural networks comprises an input coupled with an output of the first layer of the primary neural network and an output coupled with an input of a second layer of the primary neural network.

Example 52 is a non-transitory machine-readable medium containing instructions, which when executed by a processor, cause the processor to perform operations, the operations to: receive an input; generate, by a secondary neural network logic circuitry for a primary neural network logic circuitry, quantization parameters, wherein the primary neural network logic circuitry comprises a primary neural network with multiple layers trainable with an objective function, wherein each of the multiple layers of the primary neural network comprises multiple tensors, wherein the secondary neural network logic circuitry comprises one or more secondary neural networks trainable with the objective function to output the quantization parameters to the tensors; and generate, by a primary neural network logic circuitry, an output. In Example 53, the machine-readable medium of Example 52, wherein the operations further comprise training the secondary neural networks via the objective function of the primary neural network while training the primary neural network via backpropagation. In Example 54, the machine-readable medium of Example 52, wherein the secondary neural network logic circuitry is trained prior to training the primary neural network via a heuristic parameters and supervised learning. In Example 55, the machine-readable medium of Example 52, wherein the secondary neural networks comprise one or more recurrent neural networks or one or more multilayer perceptron neural networks. In Example 56, the machine-readable medium of Example 52, further comprising the operations to evaluate the output via the objective function to determine errors; and backpropagate the errors through the primary neural network logic circuitry to train the primary neural network logic circuitry. In Example 57, the machine-readable medium of Example 52, the secondary neural network logic circuitry to generate a quantization parameter for one or more tensors in each layer of the multiple layers of the primary neural network. In Example 58, the machine-readable medium of Example 57, the secondary neural network to generate a quantization parameter for each tensor in at least one layer of the multiple layers of the primary neural network. In Example 59, the machine-readable medium of Example 57, the secondary neural network logic circuitry to generate a quantization parameter for all tensors in at least one layer of the multiple layers of the primary neural network. In Example 60, the machine-readable medium of Example 59, wherein the quantization parameter comprises one or more scalar multipliers for a floating-point number of a tensor in at least one layer of the multiple layers of the primary neural network and the at least one layer performs computations with tensors as fixed-point numbers. In Example 61, the machine-readable medium of Example 57, the secondary neural network logic circuitry to generate a quantization parameter for one or more sets of tensors in at least one layer of the multiple layers of the primary neural network. In Example 62, the machine-readable medium of Example 52, wherein the one or more secondary neural networks output the quantization parameters comprising one or more scalar multipliers for a floating-point number of a tensor in at least one layer of the multiple layers of the primary neural network. In Example 63, the machine-readable medium of Example 62, wherein the one or more scalar multipliers for the tensor comprise a first scale factor for a weight of a tensor and a second scale factor for a bias of the tensor. In Example 64, the machine-readable medium of Example 52, wherein the one or more secondary neural networks comprise single-parameter neural networks or multiple parameter neural networks. In Example 65, the machine-readable medium of Example 52, wherein the one or more secondary neural networks comprise multiple-parameter neural networks. In Example 66, the machine-readable medium of Example 52, further comprising backpropagation of the errors to incrementally converge to the approximated value function based on the objective function of the primary neural network logic circuitry. In Example 67, the machine-readable medium of Example 52, further comprising backpropagation of the errors to incrementally converge to the approximated value function of the secondary neural networks based on the objective function of the primary neural network. In Example 68, the machine-readable medium of Example 52, wherein a first secondary neural network of the secondary neural networks comprises an input to receive an input of the primary neural network and an output coupled with an input of a first layer of the primary neural network; and a second neural network of the secondary neural networks comprises an input coupled with an output of the first layer of the primary neural network and an output coupled with an input of a second layer of the primary neural network. In Example 69 is an apparatus to quantize a neural network, the apparatus comprising: a means for receiving an input; a means for generating, by a secondary neural network logic circuitry for a primary neural network logic circuitry, quantization parameters, wherein the primary neural network logic circuitry comprises a primary neural network with multiple layers trainable with an objective function, wherein each of the multiple layers of the primary neural network comprises multiple tensors, wherein the secondary neural network logic circuitry comprises one or more secondary neural networks trainable with the objective function to output the quantization parameters to the tensors; and a means for generating, by a primary neural network logic circuitry, an output. In Example 70, the apparatus of Example 69, further comprising a means for training the secondary neural networks via the objective function of the primary neural network while training the primary neural network via backpropagation. In Example 71, the apparatus of Example 69, wherein the secondary neural network logic circuitry is trained prior to training the primary neural network via a heuristic parameters and supervised learning. In Example 72, the apparatus of Example 69, wherein the secondary neural networks comprise one or more recurrent neural networks or one or more multilayer perceptron neural networks. In Example 73, the apparatus of Example 69, further comprising a means for evaluating the output via the objective function to determine errors; and a means for backpropagating the errors through the primary neural network logic circuitry to train the primary neural network logic circuitry. In Example 74, the apparatus of Example 69, the secondary neural network logic circuitry to generate a quantization parameter for one or more tensors in each layer of the multiple layers of the primary neural network. In Example 75, the apparatus of Example 74, the secondary neural network to generate a quantization parameter for each tensor in at least one layer of the multiple layers of the primary neural network. In Example 76, the apparatus of Example 74, the secondary neural network logic circuitry to generate a quantization parameter for all tensors in at least one layer of the multiple layers of the primary neural network. In Example 77, the apparatus of Example 76, wherein the quantization parameter comprises one or more scalar multipliers for a floating-point number of a tensor in at least one layer of the multiple layers of the primary neural network and the at least one layer performs computations with tensors as fixed-point numbers. In Example 78, the apparatus of Example 74, the secondary neural network logic circuitry to generate a quantization parameter for one or more sets of tensors in at least one layer of the multiple layers of the primary neural network. In Example 79, the apparatus of Example 69, wherein the one or more secondary neural networks output the quantization parameters comprising one or more scalar multipliers for a floating-point number of a tensor in at least one layer of the multiple layers of the primary neural network. In Example 80, the apparatus of Example 79, wherein the one or more scalar multipliers for the tensor comprise a first scale factor for a weight of a tensor and a second scale factor for a bias of the tensor. In Example 81, the apparatus of Example 69, wherein the one or more secondary neural networks comprise single-parameter neural networks or multiple parameter neural networks. In Example 82, the apparatus of Example 69, further comprising a means for evaluating the output via the objective function to determine errors; and a means for backpropagating the errors through the primary neural network logic circuitry to train the primary neural network logic circuitry. In Example 83, the apparatus of Example 69, further comprising a means for backpropagation of the errors to incrementally converge to the approximated value function based on the objective function of the primary neural network logic circuitry. In Example 84, the apparatus of Example 69, further comprising a means for backpropagation of the errors to incrementally converge to the approximated value function of the secondary neural networks based on the objective function of the primary neural network. In Example 85, the apparatus of Example 69, wherein a first secondary neural network of the secondary neural networks comprises an input to receive an input of the primary neural network and an output coupled with an input of a first layer of the primary neural network; and a second neural network of the secondary neural networks comprises an input coupled with an output of the first layer of the primary neural network and an output coupled with an input of a second layer of the primary neural network.

What is claimed is:

1. An apparatus to quantize a neural network, the apparatus comprising:
    a primary neural network logic circuitry to generate an output; and
    a secondary neural logic circuitry coupled with the primary neural network logic circuitry to receive an input; to generate for the primary neural network logic circuitry, quantization parameters, wherein the primary neural network logic circuitry comprises a primary neural network with multiple layers trainable with an objective function, wherein each of the multiple layers of the primary neural network comprises multiple tensors, wherein the secondary neural network logic circuitry comprises one or more secondary neural networks trainable with the objective function to output the quantization parameters to the tensors.

2. The apparatus of claim 1, further comprising backpropagation logic to train the secondary neural networks with the objective function concurrently with the primary neural network via backpropagation.

3. The apparatus of claim 1, wherein the secondary neural network logic circuitry is trained prior to training the primary neural network via heuristic parameters and supervised learning.

4. The apparatus of claim 1, wherein the secondary neural networks comprise one or more recurrent neural networks.

5. The apparatus of claim 1, wherein the secondary neural networks comprise one or more multilayer perceptron neural networks.

6. The apparatus of claim 1, wherein the one or more secondary neural networks comprise multiple parameter neural networks.

7. The apparatus of claim 1, further comprising evaluation logic coupled with the primary neural network logic circuitry to receive the output of the primary neural network logic circuitry and to determine errors in the output of the primary neural network logic circuitry via the objective function; and backpropagation logic to backpropagate the errors through the primary neural network logic circuitry to train the primary neural network logic circuitry.

8. The apparatus of claim 1, wherein a first secondary neural network of the one or more secondary neural networks comprises an input to receive an input of the primary neural network and an output coupled with an input of a first layer of the primary neural network; and a second neural network of the one or more secondary neural networks comprises an input coupled with an output of the first layer of the primary neural network and an output coupled with an input of a second layer of the primary neural network.

9. A method to quantize a neural network, the method comprising:
    generating, by a secondary neural network logic circuitry for a primary neural network logic circuitry, quantization parameters, wherein the primary neural network logic circuitry comprises a primary neural network with multiple layers trainable with an objective function, wherein each of the multiple layers of the primary neural network comprises multiple tensors, wherein the secondary neural network logic circuitry comprises one or more secondary neural networks trainable with the objective function to output the quantization parameters to the tensors; and
    generating, by a primary neural network logic circuitry, an output.

10. The method of claim 9, further comprising training the secondary neural networks via the objective function of the primary neural network while training the primary neural network via backpropagation.

11. The method of claim 9, wherein the secondary neural network logic circuitry is trained prior to training the primary neural network via heuristic parameters and supervised learning.

12. The method of claim 9, the secondary neural network logic circuitry to generate a quantization parameter for one or more tensors in each layer of the multiple layers of the primary neural network.

13. The method of claim 12, the secondary neural network to generate a quantization parameter for each tensor in at least one layer of the multiple layers of the primary neural network.

14. The method of claim 12, the secondary neural network logic circuitry to generate a quantization parameter for all tensors in at least one layer of the multiple layers of the primary neural network.

15. The method of claim 14, wherein the quantization parameter comprises one or more scalar multipliers for a floating-point number of a tensor in at least one layer of the multiple layers of the primary neural network and the at least one layer performs computations with tensors as fixed-point numbers.

16. The method of claim 12, the secondary neural network logic circuitry to generate a quantization parameter for one or more sets of tensors in at least one layer of the multiple layers of the primary neural network.

17. A system to quantize a neural network, the system comprising:
    a memory comprising dynamic random-access memory; and
    an integrated circuit comprising:
        a primary functional block to generate an output; and
        a secondary functional block coupled with the primary functional block to receive an input; to generate for the primary functional block, quantization parameters, wherein the primary functional block comprises a primary neural network with multiple layers trainable with an objective function, wherein each of the multiple layers of the primary neural network comprises multiple tensors, wherein the secondary functional block comprises one or more secondary neural networks trainable with the objective function to output the quantization parameters to the tensors.

18. The system of claim 17, further comprising backpropagation logic circuitry to train the secondary neural networks with the objective function concurrently with training of the primary neural network via backpropagation.

19. The system of claim 17, wherein the secondary functional block is trained prior to training the primary neural network via heuristic parameters and supervised learning.

20. The system of claim 17, wherein the one or more secondary neural networks output the quantization parameters comprising one or more scalar multipliers for a floating-point number of a tensor in at least one layer of the multiple layers of the primary neural network.

21. The system of claim 20, wherein the one or more scalar multipliers for the tensor comprise a first scale factor for a weight of a tensor and a second scale factor for a bias of the tensor.

22. A non-transitory machine-readable medium containing instructions, which when executed by a processor, cause the processor to perform operations, the operations to:

generate, by a secondary neural network logic circuitry for a primary neural network logic circuitry, quantization parameters, wherein the primary neural network logic circuitry comprises a primary neural network with multiple layers trainable with an objective function, wherein each of the multiple layers of the primary neural network comprises multiple tensors, wherein the secondary neural network logic circuitry comprises one or more secondary neural networks trainable with the objective function to output the quantization parameters to the tensors; and generate, by a primary neural network logic circuitry, an output.

23. The machine-readable medium of claim 22, further comprising the operations to train the secondary neural networks via the objective function of the primary neural network while training the primary neural network via backpropagation.

24. The machine-readable medium of claim 22, wherein the secondary neural network logic circuitry is trained prior to training the primary neural network via heuristic parameters and supervised learning.

25. The machine-readable medium of claim 22, wherein a first secondary neural network of the one or more secondary neural networks comprises an input to receive an input of the primary neural network and an output coupled with an input of a first layer of the primary neural network; and a second neural network of the one or more secondary neural networks comprises an input coupled with an output of the first layer of the primary neural network and an output coupled with an input of a second layer of the primary neural network.

* * * * *